(12) United States Patent
Li et al.

(10) Patent No.: US 11,886,107 B2
(45) Date of Patent: Jan. 30, 2024

(54) PROJECTION METHOD AND PROJECTION DEVICE

(71) Applicant: IVIEW DISPLAYS (SHENZHEN) COMPANY LTD., Shenzhen (CN)

(72) Inventors: Yong Li, Shenzhen (CN); Zhiqiang Gao, Shenzhen (CN); Steve Yeung, Shenzhen (CN); Tak Yeung, Shenzhen (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 238 days.

(21) Appl. No.: 17/389,443

(22) Filed: Jul. 30, 2021

(65) Prior Publication Data

US 2021/0360207 A1 Nov. 18, 2021

Related U.S. Application Data

(63) Continuation of application No. PCT/CN2019/129517, filed on Dec. 28, 2019.

(30) Foreign Application Priority Data

Jan. 31, 2019 (CN) .......................... 201910099193.3

(51) Int. Cl.
*G03B 7/08* (2021.01)
*G03B 9/02* (2021.01)
(Continued)

(52) U.S. Cl.
CPC ................. *G03B 7/08* (2013.01); *G03B 9/02* (2013.01); *G03B 21/53* (2013.01); *H04N 9/317* (2013.01); *H04N 9/3194* (2013.01)

(58) Field of Classification Search
CPC ...... G03B 21/14; G03B 21/53; G03B 21/142; G03B 21/145; G03B 21/147; G03B 7/08;
(Continued)

(56) References Cited

U.S. PATENT DOCUMENTS

2007/0195288 A1\* 8/2007 Ahn .......................... H04N 5/74
353/97
2009/0284544 A1 11/2009 Nobori
(Continued)

FOREIGN PATENT DOCUMENTS

| CN | 101017245 A | 8/2007 |
| CN | 101026718 A | 8/2007 |

(Continued)

*Primary Examiner* — Sultan Chowdhury
(74) *Attorney, Agent, or Firm* — IPRO, PLLC

(57) ABSTRACT

Embodiments of the present application relate to the technical field of projection, and in particular, relate to a projection method and a projection device. The projection method includes: acquiring a projection image and an environmental image when a screen picture is projected to a projection region, wherein the environmental image includes an image when a predetermined projection screen picture is projected to the projection region or an image when no screen picture is projected to the projection region; regulating an aperture based on the projection image and the environmental image, wherein the aperture is configured to control a light flux projected to the projection region. Therefore, by adjusting the light flux, impacts caused by the stray light may be mitigated, and a relationship between projection contrast and luminance may be better coordinated, such that the projection contrast and luminance are effectively balanced and hence projection quality is improved.

16 Claims, 13 Drawing Sheets

(51) Int. Cl.
*G03B 21/53* (2006.01)
*H04N 9/31* (2006.01)

(58) Field of Classification Search
CPC .. G03B 7/0805; G03B 7/09908; H04N 9/317; H04N 9/3185; H04N 9/3194; G06V 10/25; G06V 10/30; G06V 10/40; G06V 10/60; G06T 7/11; G06T 7/12; G06T 7/13
See application file for complete search history.

(56) References Cited

U.S. PATENT DOCUMENTS

| | | | | |
|---|---|---|---|---|
| 2013/0235092 | A1* | 9/2013 | Nakashin | G09G 5/10 353/121 |
| 2013/0342816 | A1* | 12/2013 | Furui | G03B 21/147 353/121 |
| 2018/0284588 | A1* | 10/2018 | Wu | G03B 21/53 |
| 2019/0146313 | A1* | 5/2019 | De La Cruz | G03B 21/142 345/581 |
| 2020/0065943 | A1* | 2/2020 | Suzuki | G03B 21/02 |

FOREIGN PATENT DOCUMENTS

| | | | |
|---|---|---|---|
| CN | 101377610 | A | 3/2009 |
| CN | 102316295 | A | 1/2012 |
| CN | 105208308 | A | 12/2015 |
| CN | 107102736 | A | 8/2017 |
| CN | 107888891 | A | 4/2018 |
| CN | 108600714 | A | 9/2018 |
| CN | 109698948 | A | 4/2019 |

\* cited by examiner

PROJECTION METHOD AND PROJECTION DEVICE

TECHNICAL FIELD

Embodiments of the present application relate to the technical field of projection, and in particular, relate to a projection method and a projection device.

BACKGROUND

With the development of computer multimedia display technologies, projectors, as preferable large-screen display devices, have gradually become standard computer peripheral products, and have been widely used in fields of educations, commerce, and the like.

SUMMARY

Embodiments of the present application are intended to provide a projection method and a projection device, which are capable of reducing impacts caused by stray light.

To solve the above technical problem, the embodiments of the present application provide the following technical solutions:

The embodiments of the present application provide a projection method, includes:
  acquiring a projection image and an environmental image when a screen picture is projected to a projection region, wherein the environmental image includes an image when a predetermined projection screen picture is projected to the projection region or an image when no screen picture is projected to the projection region;
  regulating an aperture based on the projection image and the environmental image, wherein the aperture is configured to control a light flux projected to the projection region.

The embodiments of the present application provide a projection device, includes:
  a projection module, configured to project a projection screen picture to a projection region;
  an image acquisition module, configured to acquire an image of the projection region;
  an aperture, configured to control a light flux projected to the projection region; and
  a controller, connected to the projection module and the image acquisition module;
  wherein the projection module comprises an illumination light source and a projection lens, the projection lens being arranged on a light exit side of the illumination light source, the aperture being arranged between the illumination light source and the projection lens;
  wherein the controller comprises:
  at least one processor; and
  a memory communicably connected to the at least one processor; wherein the memory stores instructions executable by the at least one processor, wherein the instructions, when executed by the at least one processor, cause the at least one processor to perform:
  acquiring a projection image and an environmental image when a screen picture is projected to a projection region, wherein the environmental image comprises an image when a predetermined projection screen picture is projected to the projection region or an image when no screen picture is projected to the projection region;
  regulating an aperture based on the projection image and the environmental image, wherein the aperture is configured to control a light flux projected to the projection region.

In the projection method according to the embodiments of the present application, first, a projection image and an environmental image when a screen picture is projected to a projection region are acquired, wherein the environmental image includes an image when a predetermined projection screen picture is projected to the projection region or an image when no screen picture is projected to the projection region; and an aperture is regulated based on the projection image and the environmental image, wherein the aperture is configured to control a light flux projected to the projection region. Therefore, by adjusting the light flux, impacts caused by the stray light may be mitigated, and a relationship between projection contrast and luminance may be better coordinated, such that the projection contrast and luminance are effectively balanced and hence projection quality is improved.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

FIG. 2b is a schematic flowchart of S22 in FIG. 2a;

FIG. 3b is a schematic flowchart of S31 in FIG. 3a;

FIG. 6b is a schematic structural diagram of a regulation module in FIG. 6a;

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

During projection, users generally desire a projection screen image that has been projected has a high quality and contrast, to hence achieve a comfortable high quality projection effect. With respect to a dynamic image, where light-dark transitions are quick, the contrast is higher and thus human eyes are capable of more easily distinguishing such transitions, such that a vivid visual experience is created to the users. However, in the projection device, the luminance and the contrast are typically mutually restricted. Where the projection device has a high luminance, more stray light may be inevitably caused. This results in degradation of the contrast.

Where the projection device has a small size, a condenser lens thereof is more approximate to a digital micromirror device. In this case, most of the off-state light and flat-state light is reflected by the condenser lens. Severe stray light regions appear around a boundary area of the projection screen picture, which degrades projection imaging quality and impairs visual experience of the users.

Accordingly, the embodiments of the present application provide a projection device. The projection device may be constructed to any shape or applied to any suitable service scenario. For example, the projection device may be constructed to a projection-type mobile phone, a large-scale projector, a projection-type television, or the like.

Figure 1A:
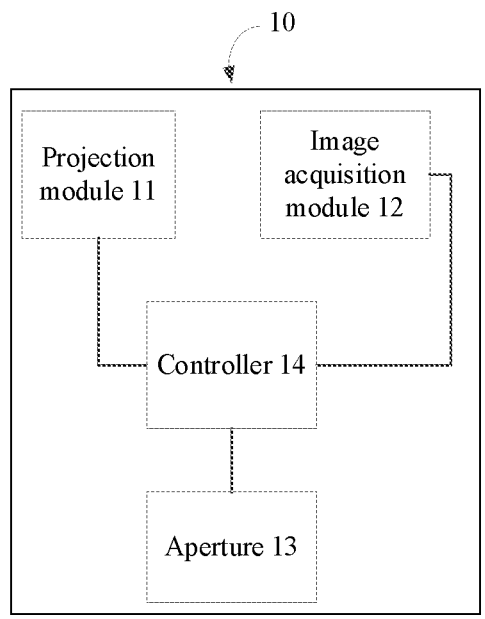
FIG. 1a is a schematic structural diagram of a projection device according to an embodiment of the present application.

Referring to FIG. 1a, a projection device 10 includes a projection module 11, an image acquisition module 12, an aperture 13, and a controller 14.

The projection module 11 is configured to project a projection screen picture to a projection region; wherein the projection screen picture may be an image in any suitable image format. The projection module 11 may be any suitable type of projection module, for example, a projection module employing the CRT, LCD, or DLV technology.

Figure 1B:
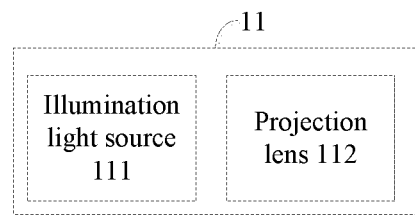
FIG. 1b is a schematic structural diagram of a projection module according to an embodiment of the present application.

In some embodiments, referring to FIG. 1b, the projection module 11 includes an illumination light source 111 and a projection lens 112. The projection lens 112 is arranged on a light exit side of the illumination light source 111, and the aperture 13 is arranged between the illumination light source 111 and the projection lens 112. The aperture 13 is regulated to block a light flux passing through the projection lens 112 from the illumination light source 111, thereby reducing impacts caused by stray light.

The image acquisition module 12 is configured to acquire an image of the projection region. The image acquisition module 12 includes one or more optical sensors and a lens. The one or more optical sensors are arranged an imaging surface of the lens. During capturing an image for the projection region, a generated optical image is projected to the optical sensor by the lens. The optical sensor includes a charge-coupled device (CCD) and a complementary metal-oxide semiconductor (CMOS). The CMOS sensor may be a back-illuminated CMOS sensor or a stack CMOS sensor.

In some embodiments, the image acquisition module 12 is further integrated with an image signal processor (ISP). The ISP is configured to process output data of the optical sensor, for example, automatic exposure control (AEC), automatic gain control (AGC), automatic white balance (AWB), color correction, or the like functions.

The aperture 13 is configured to control a light flux projected to the projection region. For example, the aperture 13 is capable of moving back and forth along a direction perpendicular to a light exit axis of the illumination light source 111, to control the light flux projected to the projection region. Where the aperture 13 is capable of moving along the direction perpendicular to the light exit axis of the illumination light source 111 and towards a direction away from the light exit axis, the aperture 13 increases a portion of projection light projected from the illumination light source 111 to the projection lens 112. Where the aperture 13 is capable of moving along the direction perpendicular to the light exit axis of the illumination light source 111 and towards a direction proximal to the light exit axis, the aperture 13 blocks a portion of projection light projected from the illumination light source 111 to the projection lens 112. In this way, the impacts caused by the stray light are reduced, and contrast is improved.

Figure 1C:
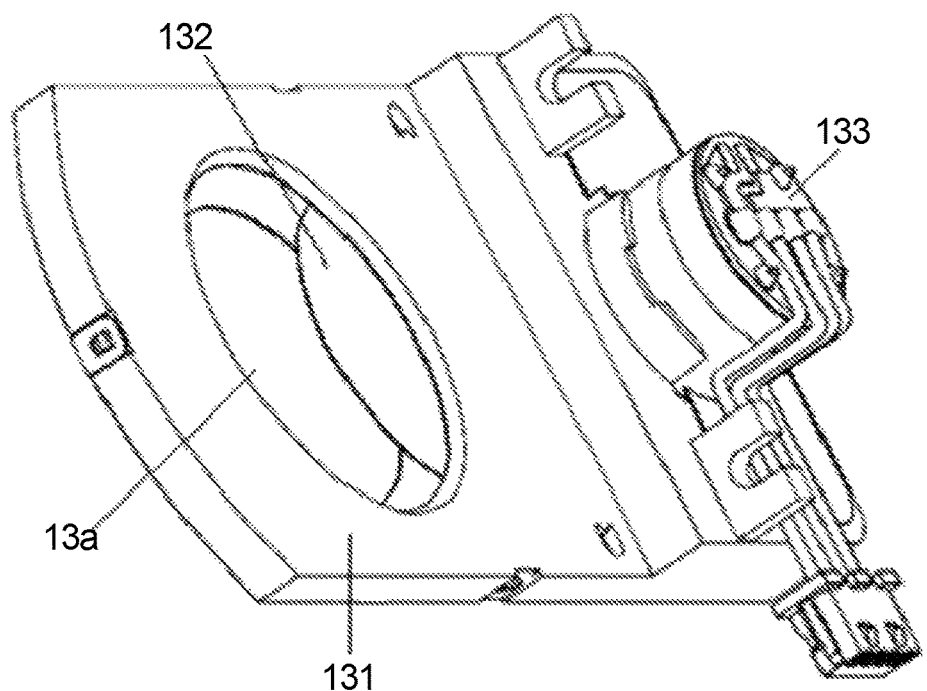
FIG. 1c is a schematic structural view of an aperture according to an embodiment of the present application.

In some embodiments, referring to FIG. 1c, the aperture 13 includes a base 131, a light blocking sheet 132, and a regulation device 133.

The base 131 is provided with a light through hole 13a, wherein the light through hole 13a includes a central axis. In some embodiments, at least one light through hole 13a may be provided. When the projection module 11 projects the projection screen picture, projection light is capable of passing through the light through hole 13a and is projected out.

The light blocking sheet 132 is arranged on the base 131, and the light blocking sheet 132 is capable of moving away from or close to the central axis of the light through hole 13a, to regulate an opening area of the light through hole 13a.

The regulation device 133 is arranged on the base 131, and the regulation device 133 is connected to the light blocking sheet 132 and the controller 14. The regulation device 133 is configured to control movement of the light blocking sheet 132. For example, in some embodiments, the regulation device 133 includes a motor and a transmission mechanism. The motor is connected to the transmission mechanism. The transmission mechanism is connected to the light blocking sheet 132, and the motor is further connected to the controller 14. The controller 14 issues a control command to the motor, and the motor, based on the control command, controls, by the transmission mechanism. The light blocking sheet 132 to move away from or close to the central axis of the light through hole 13a, to regulate the opening area of the light through hole 13a. For example, when the light blocking sheet 132 is controlled to move away from the central axis of the light through hole 13a, the opening area of the light through hole 13a is increased. When the light blocking sheet 132 is controlled to move close to the central axis of the light through hole 13a, the opening area of the light through hole 13a is decreased.

In some embodiments, the transmission mechanism may include a transmission shaft or any suitable transmission unit formed by a transmission link.

Figure 1D:
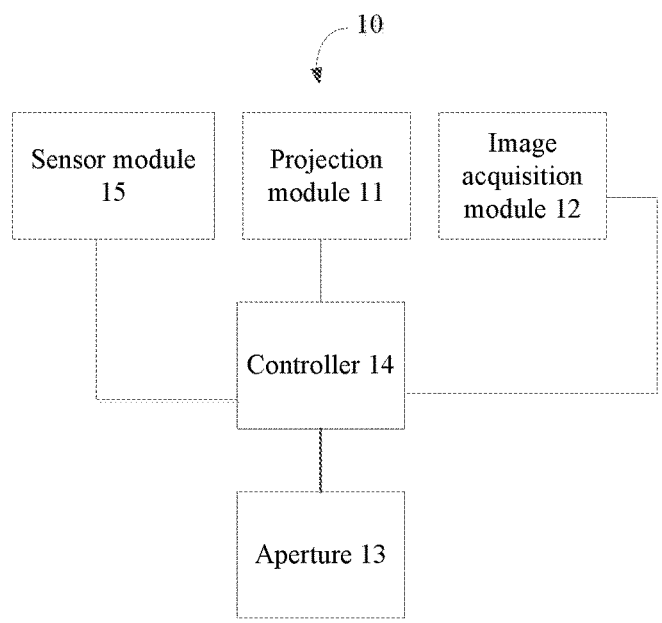
FIG. 1d is a schematic structural diagram of a projection device according to another embodiment of the present application.

In some embodiments, referring to FIG. 1d, the projection device 10 further includes a sensor module 15, wherein the sensor module 15 is connected to the controller 14.

The sensor module 15 is configured to acquire environmental data of the projection environment of the projection region, and transmit the environmental data to the controller 14. The controller 14 analyzes the environmental data, and hence executes a predetermined projection logic based on an analysis result.

In some embodiments, the sensor module 15 includes an environment detection device, wherein the environment detection device detects variations of the projection environment in real time, for example, detecting an environmental light luminance and/or a projection position. Hence, the environment detection device acquires the environmental data, and the controller 14 analyzes the environmental data and determines whether the environmental light luminance and/or the projection position has changed, and in addition, executes the predetermined projection logic based on a variation result.

In some embodiments, the environment detection device includes a light sensitive detection device and/or a position movement sensor, wherein the light sensitive detection device is configured to detect the environmental light luminance, and the position movement sensor is configured to determine the projection position.

In summary, with the projection device according to the embodiments of the present application, the impacts caused by the stray light are reduced, the projection contrast is improved, and hence the projection quality is improved.

In another aspect of the embodiments of the present application, an embodiment of the present application further provides a projection method. The projection method may be a set of several instructions and applicable to the projection device according to the above embodiment, such that the projection device, when executing the instructions, is caused to perform the objectives or functions of the projection method.

Figure 2A:
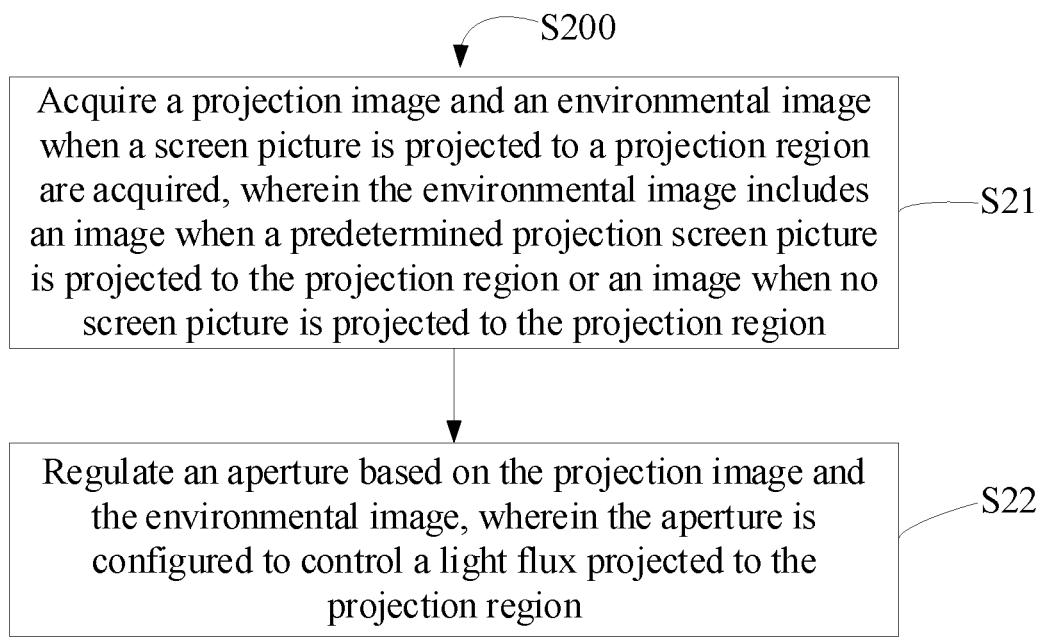
FIG. 2a is a schematic flowchart of a projection method according to an embodiment of the present application.

Referring to FIG. 2a, the projection method S200 includes:

In S21, a projection image and an environmental image when a screen picture is projected to a projection region are acquired, wherein the environmental image includes an image when a predetermined projection screen picture is projected to the projection region or an image when no screen picture is projected to the projection region.

In this embodiment, the projection region is a region to which the projection screen picture is projected, wherein the projection region may be selected by a user according to actual needs. For example, the projection region may be a projection screen picture or a projection wall or the like. Generally, when the projection screen picture is projected to a particular position, the projection screen picture is displayed at the particular position, wherein a total region corresponding to the particular position is the projection region.

It may be understood that the projection region is variable, instead of being constant. For example, the projection region may be a projection screen in an office A. By increasing the area of the projection screen, the projection region is also increased.

In this embodiment, the projection image is an image captured by a projection device for the projection region when the projection screen picture is projected to the projection region. The projection image includes a screen image of the projection screen picture in the projection region, a stray light region image of the stray light in the projection region, and an environmental light region image of the environmental light in the projection region.

In this embodiment, the environmental image may be an image captured by the projection device for the projection region when no projection screen picture is projected to the projection region. In the environmental image, since no screen picture is projected to the projection region, the projection region does not include the screen image of the projection screen picture in the projection region nor the stray light region image of the stray light in the projection region. In addition, the environmental image only includes the environmental light region image of the environmental light in the projection region.

In some embodiments, the environmental image may also be an image captured by the projection device for the projection region when the predetermined projection screen picture is projected to the projection region, wherein the predetermine projection region includes an all-black projection screen picture and the like.

In this embodiment, the image acquisition module may be arranged in the projection device, for ease of acquiring the projection image or the environmental image. In some embodiments, the image acquisition module may also be arranged at other positions. Upon acquiring the projection image or the environmental image, the image acquisition module transmits the projection image or the environmental image to the projection device by a wireless module. Therefore, a plurality of ways are available for acquisition of the projection image or the environmental image.

In this embodiment, when the projection image needs to be acquired, the projection device automatically enables the projection module, and projects the projection screen picture to the projection region, and subsequently, the image acquisition module captures an image for the projection region to acquire the projection image. Afterwards, the projection device disables the projection module, and stops projecting the projection screen picture to the projection region, and the image acquisition module captures an image for the projection region to acquire the environmental image.

In S22, an aperture is regulated based on the projection image and the environmental image, wherein the aperture is configured to control a light flux projected to the projection region.

In this embodiment, the projection device analyzes, using an image analysis algorithm, the projection image and the environmental image to determine whether the stray light is still present, and further determine a position of the stray light in the projection region when the stray light is present. In addition, the projection device regulates the aperture based on an analysis result, to reduce or eliminate the stray light. Since the aperture is capable of blocking a portion of the projection light from being projected to the projection region, a case where the stray light is caused because a portion of the projection light is projected to the projection region is mitigated or avoided. For example, when the stray light is present, the projection device constantly constricts the aperture to reduce the light flux passing through the aperture until the stray light is reduced or eliminated.

In summary, by adjusting the aperture, impacts caused by the stray light may be mitigated, and a relationship between the projection contrast and the luminance may be better coordinated, such that the projection contrast and luminance are effectively balanced and hence projection quality is improved.

In some embodiments, for acquisition of the projection image with a high quality and for ease of reduction or elimination of the stray light, during projection, the projection device needs to be initialized for clear projection display. For example, in some embodiments, first, the projection device initializes the projection function to achieve automatic focusing. When the projection device is automatically focused, the projection device is capable of clearly projecting images. In this case, the projection device does not move and thus the projection position is not changed. Second, the projection device projects the predetermined projection screen picture to the projection region. The predetermined projection screen picture includes an image with a white background and a black frame. Since in the image with the white background and the black frame, contrast of the white region relative to the surrounding region is significant, that is, the luminance of the white region in the image is greatly different from the luminance of the surrounding region in the same image, the image may be better used to position the region where the stray light is distributed, that is, better determining the stray light region. In this way, the screen images of the stray light region image and the projection screen picture in the projection image are more easily determined.

Figure 2B:
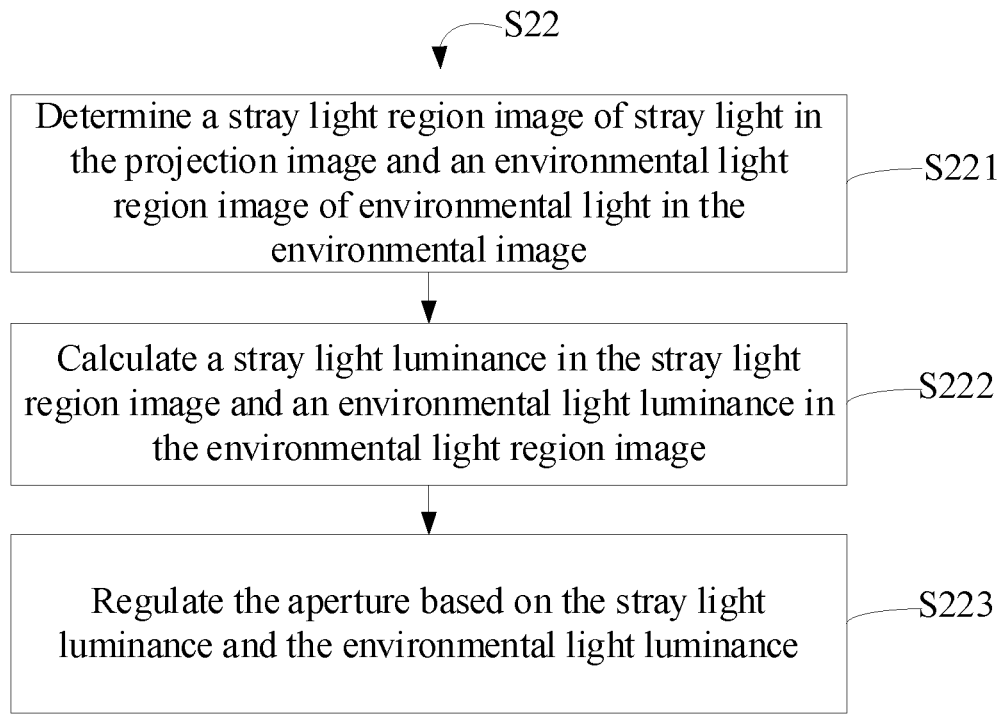

In some embodiments, the aperture is regulated based on a stray light luminance and an environmental light luminance. For example, referring to FIG. 2b, S22 includes:

S221, determining a stray light region image of stray light in the projection image and an environmental light region image of environmental light in the environmental image;

S222, calculating a stray light luminance in the stray light region image and an environmental light luminance in the environmental light region image; and S223, regulating the aperture based on the stray light luminance and the environmental light luminance.

In this embodiment, the stray light is light generated in the vicinity of the projection screen picture and reducing the quality of the projection screen picture when the projection screen picture is projected to the projection region, and the environmental light is light projected by the ambient environment to the projection region. The ambient environment includes a natural environment or a light source that is present in the natural environment and capable of generating light.

The stray light region image is an image captured after the stray light is projected to the projection region, wherein the projection image includes the stray light region image.

The environmental light region image is an image captured after the environmental light is projected to the projection region, wherein the environmental light region image is not only included in the projection image but also included in the environmental image.

It may be understood that an intersection is present between the stray light region image and the environmental light region image. For example, referring to FIG. 2c, a projection image 2c0 includes a screen image 2c1, a stray light region image 2c2, and an environmental light region image 2c3. The screen image 2c1 is an image acquired after the projection screen picture is projected to the projection region, the stray light region image 2c2 is a stray light region image mainly generated by the stray light, and the environmental light region image 2c3 is an environmental light region image mainly generated by the environmental light. The screen image 2c1 is in a quadrilateral shape, including four intersections A, B, C, and D.

It may be understood that a same coordinate system may be established for the projection image and the environmental image, and hence coordinates of the screen image, coordinates of the stray light region image, and coordinates of the environmental light region image are determined. In addition, in consideration of correlation between the screen image in the projection image and the screen image in the environmental image, it may be understood that when a position of the screen image is mapped to the environmental image, the position may be occupied by the environmental light. That is, although the environmental image does not include the screen image, the position of the screen image in the projection image may be mapped to the same position in the environmental image.

In this embodiment, the projection device determines, using the image analysis algorithm, the stray light region image from the projection image, and determines the environmental image from the environmental light region image. Accordingly, the projection device is capable of calculating the stray light luminance of the stray light region image and the environmental light luminance of the environmental light region image. The stray light luminance may be an average of luminances of all pixel points in the stray light region image, or may be a luminance of a particular pixel point in the stray light region image, or may be a luminance determined in other fashions. Likewise, the environmental light luminance is an average of luminances of all pixel points in the environmental light region image, or may be a luminance of a particular pixel point in the environmental light region image, or may be a luminance determined in other fashions.

In this embodiment, the projection device may regulate the aperture based on the stray light luminance and the environmental light luminance in a plurality of fashions. For example, the projection device calculates a luminance difference between the stray light luminance and the environmental light luminance, identifies whether the luminance difference satisfies a predetermined threshold condition, stops regulating the aperture in response to identifying that the luminance difference satisfies the predetermined threshold condition, and continues regulating the aperture in response to identifying that the luminance difference does not satisfy the predetermined threshold condition. For example, during the process of continuing regulating the aperture, the projection device continues acquiring another projection image frame screen picture is projected to the projection region, and regulates the aperture based on the another projection image frame and the environmental image, until the luminance difference satisfies the predetermined threshold condition.

Since an aperture value of a projection image frame corresponding to time t fails to reduce or eliminate the stray light, the aperture is further constricted to reduce the aperture value, and the screen picture is re-projected at time t+1. Hence, the another projection image frame may be acquired. Analogously, such operations are performed until the luminance difference satisfies the predetermined threshold condition. That is, where the stray light may be reduced or eliminated, the aperture does not need to be regulated.

In addition, during re-regulation of the aperture, the projection device regulates the aperture based on the another projection image frame and the environmental image. In this way, data of the original environmental image may be fully utilized. Since generally the environment does not rapidly change, the environmental data does not need to be re-acquired, and hence the aperture is regulated based on the another projection image frame.

In some embodiments, the predetermined threshold condition includes the luminance difference being less than a predetermined threshold. For example, in response to identifying that the luminance difference is less than the predetermined threshold, the projection device stops regulating the aperture; and in response to identifying that the luminance difference is greater than the predetermined threshold, the projection device continues regulating the aperture.

Figure 2C:
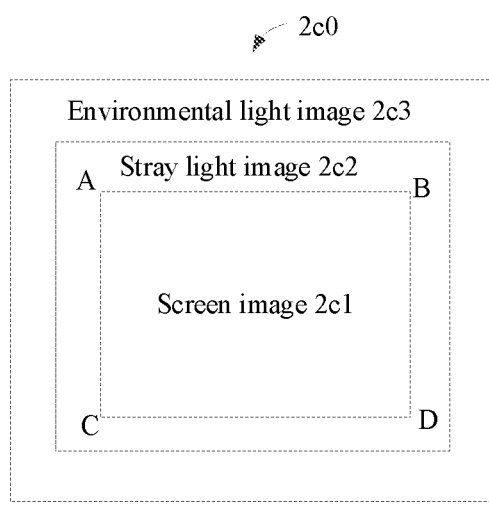
FIG. 2c is a schematic diagram of a projection image according to an embodiment of the present application.
Figure 2D:
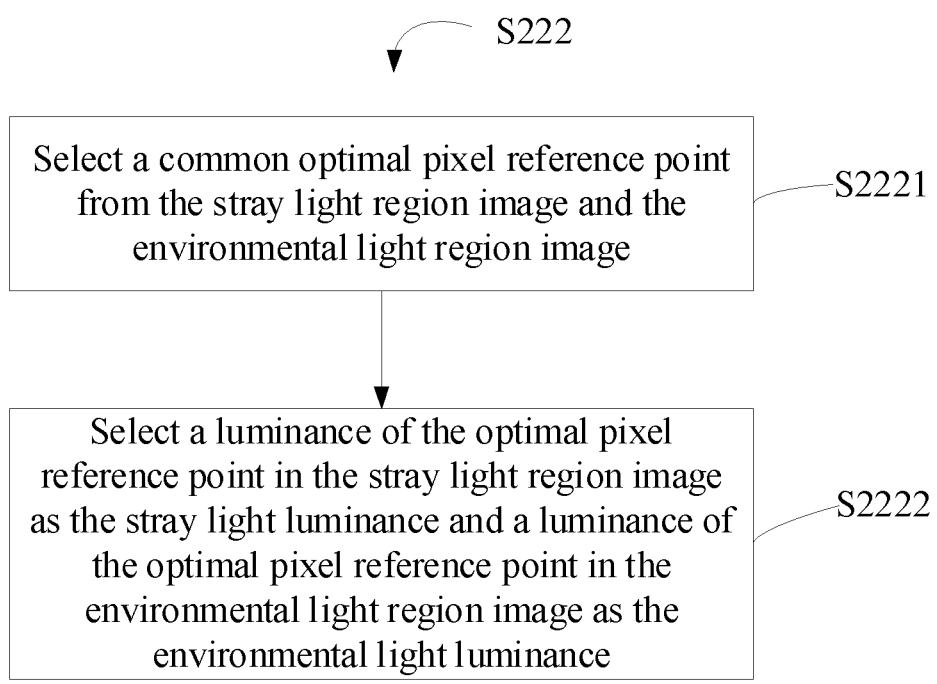
FIG. 2d is a schematic flowchart of S222 in FIG. 2b.

For a high precision in regulating the aperture and for better reduction and elimination of the stray light, in some embodiments, referring to FIG. 2d, S222 includes:

S2221, selecting a common optimal pixel reference point from the stray light region image and the environmental light region image; and S2222, selecting a luminance of the optimal pixel reference point in the stray light region image as the stray light luminance and a luminance of the optimal pixel reference point in the environmental light region image as the environmental light luminance.

In this embodiment, a size of the projection image is the same as a size of the environmental image, and thus a common coordinate system may be established for the projection image and the environmental image. Therefore, a common pixel point at the same coordinates may be found between the stray light region image and the environmental light region image. For example, a pixel point M is located in the stray light region image, and the coordinates of the pixel point M are (10, 20), and then a pixel point corresponding to the coordinates (10, 20) in the environmental image is the pixel point M. Although the coordinates of the common pixel point between the projection image and the environmental image are the same, the luminances of the common pixel point may be different or the same in different images. For example, the luminance of the pixel point M in the stray light region image is 200, and the luminance of the pixel point M in the environmental light region image is 150.

In this embodiment, the optimal pixel reference point is a pixel point that most objectively and truly reflects the impacts caused by the stray light to the projection screen picture, and the optimal pixel reference point may be determined by statistical analysis.

In some embodiments, during selection of the optimal pixel reference point, the projection device determines a common pixel point with a maximum difference between the luminances in the stray light region image and the environmental light region image as the optimal pixel reference point by traversing all common pixel points of the stray light region image and the environmental light region image. For example, all the common pixel points of the stray light region image and the environmental light region image include a pixel point A1, a pixel point B1, a pixel point C1, and a pixel point D1. The luminance of the pixel point A1 in the stray light region image is 200, and the luminance of the pixel point A1 in the environmental light region image is 195. The luminance of the pixel point B1 in the stray light region image is 220, and the luminance of the pixel point B1 in the environmental light region image is 200. The luminance of the pixel point C1 in the stray light region image is 220, and the luminance of the pixel point C1 in the environmental light region image is 160. The luminance of the pixel point D1 in the stray light region image is 190, and the luminance of the pixel point D1 in the environmental light region image is 180. Since a difference between the luminance of the pixel point C1 in the stray light region image and the luminance of the pixel point C1 in the environmental light region image is the maximum among those of the pixel points A1, B1, and D1, the projection device selects the pixel point C1 as the optimal pixel point reference point.

Figure 2E:
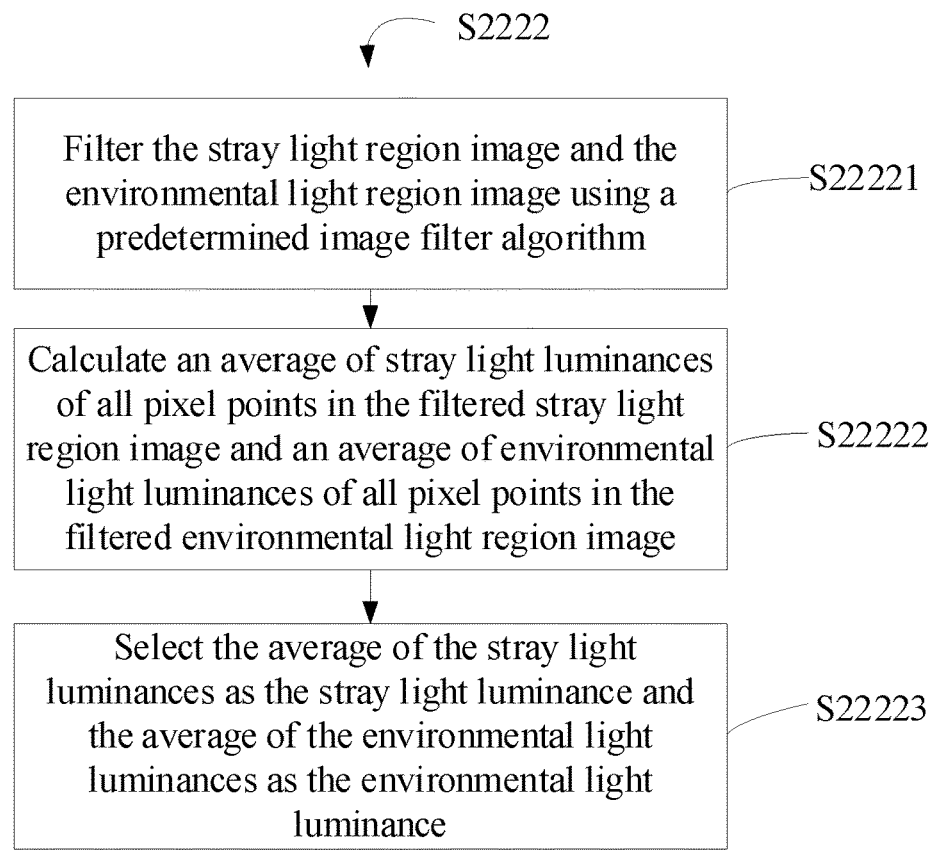
FIG. 2e is a schematic flowchart of S2222 in FIG. 2d.

For a further higher precision in regulating the aperture and for better reduction and elimination of the stray light, in some embodiments, referring to FIG. 2e, S2222 includes:

S22221, filtering the stray light region image and the environmental light region image using a predetermined image filter algorithm;

S22222, calculating an average of stray light luminances of all pixel points in the filtered stray light region image and an average of environmental light luminances of all pixel points in the filtered environmental light region image; and S22223, selecting the average of the stray light luminances as the stray light luminance and the average of the environmental light luminances as the environmental light luminance.

In this embodiment, for example, the stray light region image and the environmental light region image are filtered using the predetermined image filter algorithm, such that some noise pixel points in the stray light region image and the environmental light region image are removed, and the luminances of all the original pixel points are optimized. For example, all the pixel points in the filtered stray light region include [A1, A2, A3, . . . , A100], and all the pixel points in the filtered environmental light region image include [B1, B2, B3, . . . , B100], wherein each of the pixel points has a corresponding luminance.

Second, the projection device adds the luminances of all the pixel points in the filtered stray light region image, calculates an average of the luminances, and takes the average as the average of the stray light luminances.

Likewise, the projection device adds the luminances of all the pixel points in the filtered environmental light region image, calculates an average of the luminances, and takes the average as the average of the environmental light luminances.

In some embodiments, the predetermined image filter algorithm includes a median filter algorithm. The median filter algorithm in this embodiment employs a 3×3 filter template.

Figure 2F:
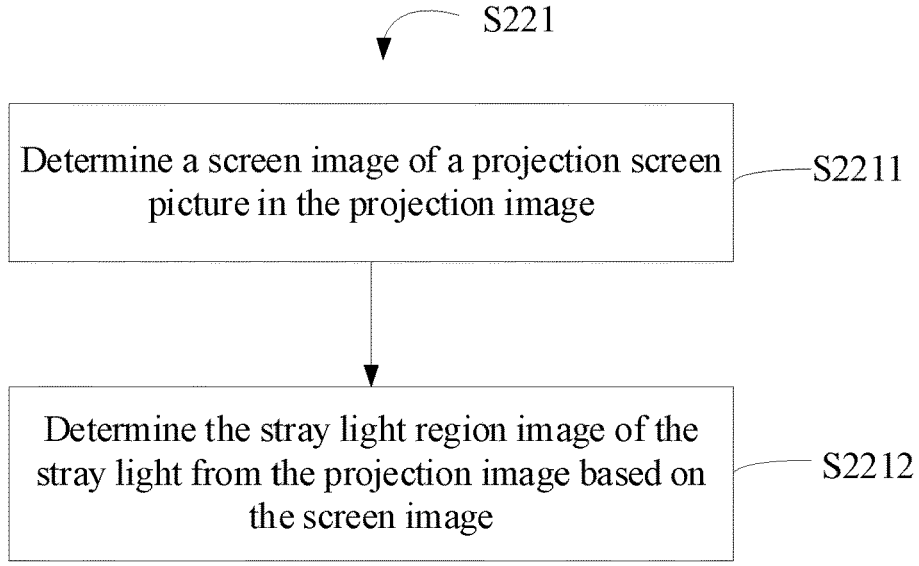
FIG. 2f is a schematic flowchart of S221 in FIG. 2b.

In some embodiments, the stray light region image of the stray light in the projection image may be determined in a plurality of fashions. For example, a luminance range of the stray light may be determined, and pixel points with the luminances falling within the luminance range of the stray light are traversed from the projection image, and the stray light region image is formed by linking the pixel points. In this way, the stray light region image of the stray light in the projection image is determined. Still for example, in some embodiments, referring to FIG. 2f, S221 includes:

S2211, determining a screen image of a projection screen picture in the projection image; and S2212, determining the stray light region image of the stray light from the projection image based on the screen image.

In this embodiment, when the projection screen picture is projected to the projection region and captured, the projection image is acquired. The projection image includes a screen image corresponding to the projection screen picture.

As described above, generally, the stray light is mainly distributed around a periphery of the projection screen picture. For example, a region that is away from a boundary of the projection screen picture by a distance between 3 cm and 10 cm is the stray light region. Therefore, upon acquisition of the projection image, in response to determining a screen image in the projection image, the stray light region image may be optimally estimated.

Figure 2G:
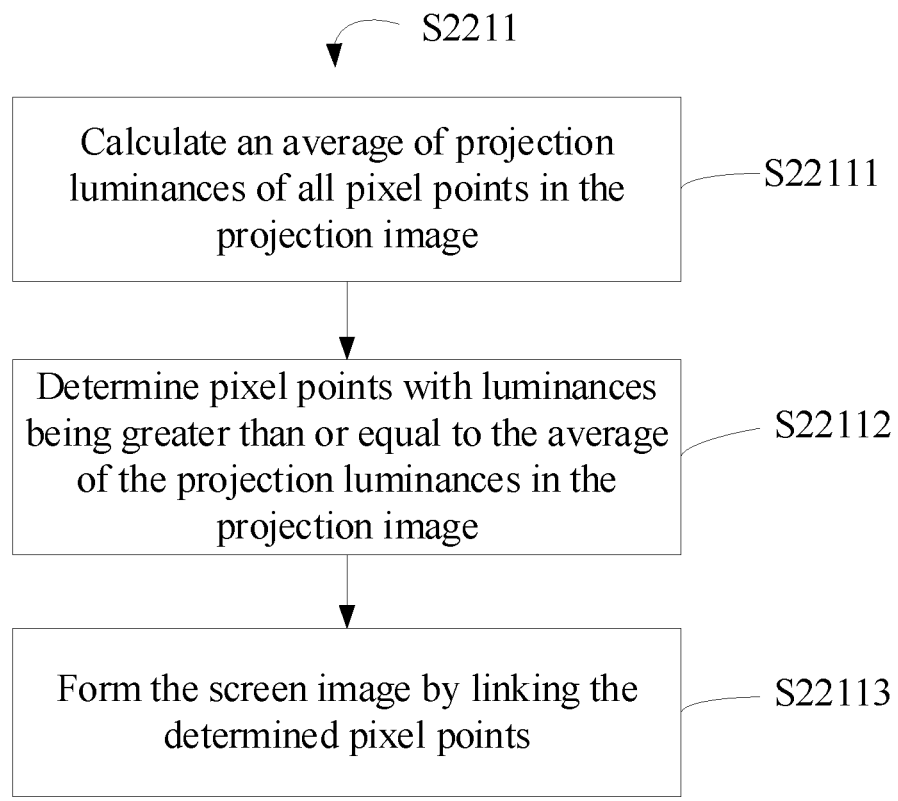
FIG. 2g is a schematic flowchart of S2211 in FIG. 2f.

In some embodiments, referring to FIG. 2g, S2211 includes:
- S22111, calculating an average of projection luminances of all pixel points in the projection image;
- S22112, determining pixel points with luminances being greater than or equal to the average of the projection luminances in the projection image; and
- S22113, forming the screen image by linking the determined pixel points.

In this embodiment, for example, first, the projection device adds the luminances of all the pixel points in the projection image, calculates an average of the luminances, and takes the average as the average of the projection luminances.

Second, the projection device determines pixel points with the luminances being greater than or equal to the average of the projection luminances from the projection image, and characterizes the pixel points of this type. For example, the projection device sets the luminances of the pixel points with the luminances being greater than or equal to the average of projection luminances to 255, and sets the luminances of the pixel points with the luminances being less than the average of projection luminances to 0

Finally, the projection device links the pixel points with the luminances being greater than or equal to the average of the projection luminances, for example, linking all the pixel points with the luminances being 255, to form the screen image. In some embodiments, the projection device links the pixel points with the luminances being less than the average of the projection luminances, for example, linking all the pixel points with the luminances being 0, to form the stray light region image or the environmental light region image.

Figure 3A:
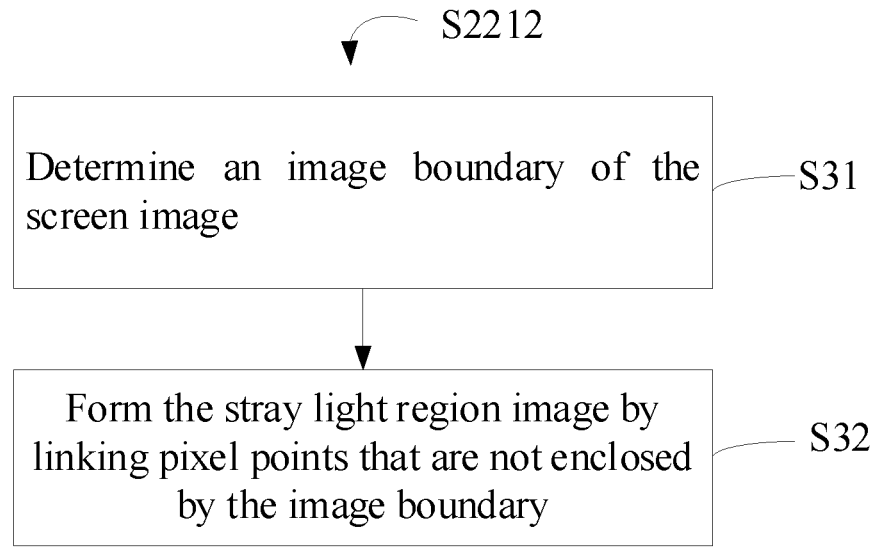
FIG. 3a is a schematic flowchart of S2212 in FIG. 2f.

In some embodiments, referring to FIG. 3a, S2212 includes:
- S31, determining an image boundary of the screen image; and
- S32, forming the stray light region image by linking pixel points that are not enclosed by the image boundary.

In this embodiment, the image boundary of the screen image may be any shape, for example, a quadrilateral shape, a triangular shape, a circular shape, a rhombus shape, or the like.

In this embodiment, the projection device determines, using the image analysis algorithm, the image boundary of the screen image from the projection image. Since the pixel points corresponding to the stray light are not located in the screen image, the stray light region image may be formed by linking the pixel points that are not enclosed by the image boundary of the screen image.

Figure 3B:
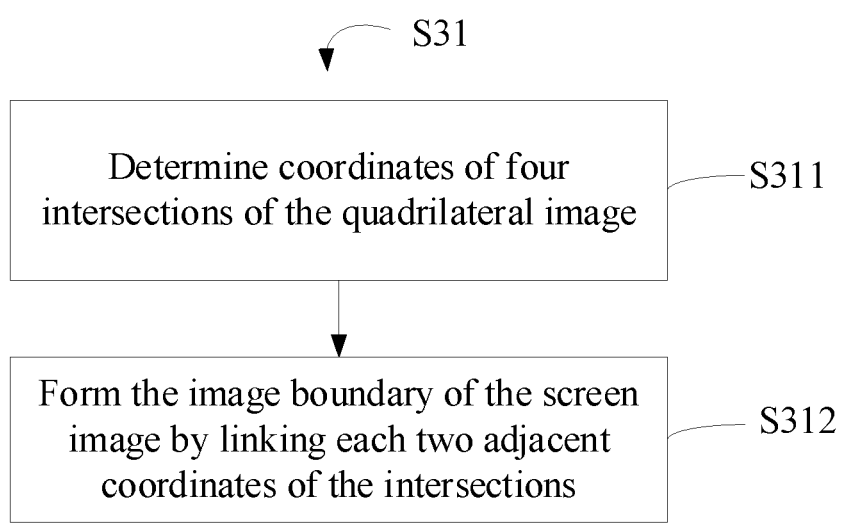

In some embodiments, the screen image includes a quadrilateral image. Referring to FIG. 3b. S31 includes:
- S311, determining coordinates of four intersections of the quadrilateral image; and
- S312, forming the image boundary of the screen image by linking each two adjacent coordinates of the intersections.

In this embodiment, for example, still referring to FIG. 2c, the quadrilateral image includes four intersections A (x1, y1), B (x2, y2), C (x3, y3), and D (x4, y4), wherein luminances at all the intersections are all 255.

Figure 4A:
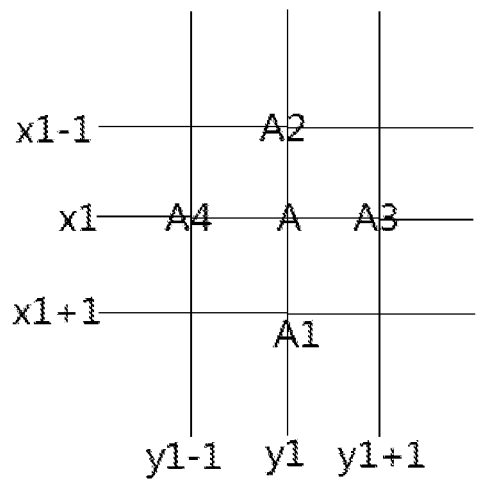
FIG. 4a to FIG. 4d are schematic diagrams of coordinates of four intersections of a quadrilateral image which is a screen image according to an embodiment of the present application.

Referring to FIG. 4a, with the intersection A as a reference point, under A, coordinates of A1 are (x1+1, y1), and the luminance thereof is 255; over A, coordinates of A2 are (x1−1, y1), and the luminance thereof is 0; on the right of A, coordinates of A3 are (x1, y1+1), and the luminance thereof is 255; and on the left of A, coordinates of A4 are (x1, y1−1), and the luminance thereof is 0.

Figure 4B:
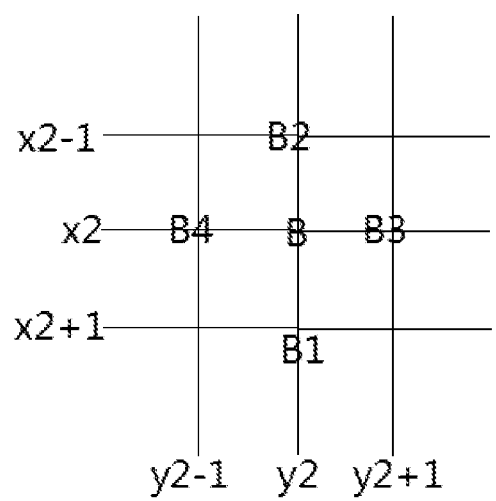

Referring to FIG. 4b, with the intersection B as a reference point, under B, coordinates of B1 are (x2+1, y2), and the luminance thereof is 255; over B, coordinates of B2 are (X2−1, y2), and the luminance thereof is 0; on the right of B, coordinates of B3 are (x2, y2+1), and the luminance thereof is 0; and on the left of B, coordinates of B4 are (x2, y2−1), and the luminance thereof is 255.

Figure 4C:
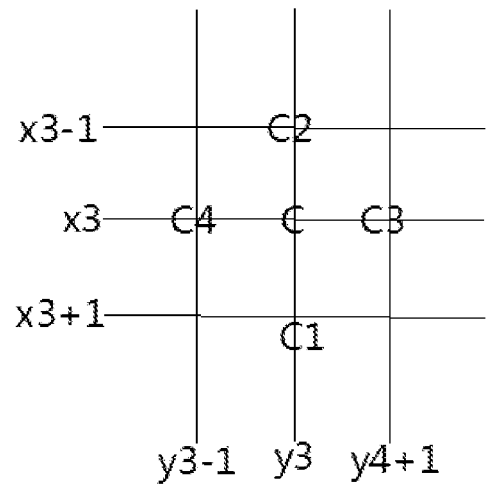

Referring to FIG. 4c, with intersection C as a reference point, under C, coordinates of C1 are (x3+1, y3), and the luminance thereof is 0; over C, coordinates of C2 are (x3−1, y3), and the luminance thereof is 255; on the right of C, coordinates of C3 are (x3, y3+1), and the luminance thereof is 255; and on the left of C, coordinates of C4 are (x3, y3−1), and the luminance thereof is 0.

Figure 4D:
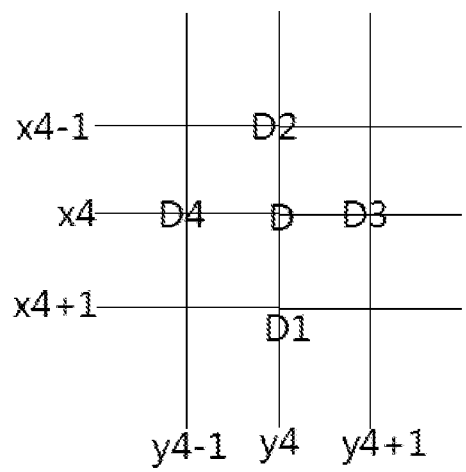

Referring to FIG. 4d, with the intersection D as a reference point, under D, coordinates of D1 are (x4+1, y4), and the luminance thereof is 0; over D, coordinates of D2 are (x4−1, y4), and the luminance thereof is 255; on the right of D, coordinates of D3 are (x4, y4+1), and the luminance thereof is 0; and on the left of D, coordinates of D4 are (x4, y4−1), and the luminance thereof is 255.

When the screen image is a quadrilateral image, in response to determining that four pixel reference points around the particular pixel point satisfy the conditions listed in FIG. 4a to FIG. 4d, the projection device may determine the particular pixel point as the intersection. In some embodiments, the number of selected pixel reference points is not limited to four. For example, where three pixel reference points are selected, the conditions are also satisfied.

Figure 5:
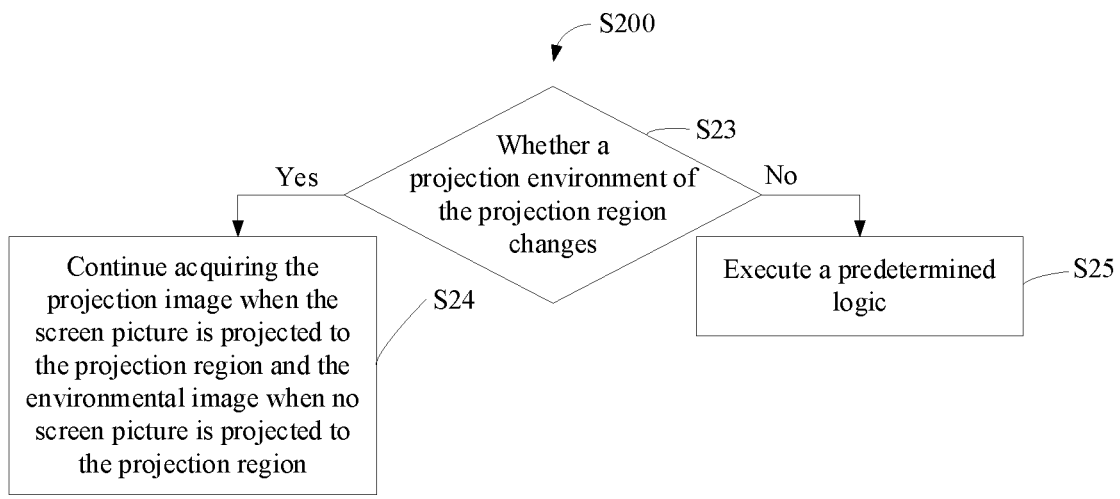
FIG. 5 is a schematic flowchart of a projection method according to another embodiment of the present application.

In some embodiments, referring to FIG. 5, the projection method S200 further includes:
- S23, monitoring whether a projection environment of the projection region changes;
- S24, continuing acquiring the projection image when the screen picture is projected to the projection region and the environmental image when no screen picture is projected to the projection region in response to monitoring that the projection environment of the projection region changes; and
- S25, executing a predetermined logic in response to monitoring that the projection environment of the projection region does not change.

In some embodiments, the projection environment includes an environmental light luminance and/or a projection position, and changes of the projection environment include changes of the environmental light luminance and/or changes of the projection position. The projection image changes may cause changes of the stray light region luminance, changes of the boundary of the screen image, and changes of the stray light region image. During normal projection display upon reduction or elimination of the stray light, in response to detecting a change of the projection environment, for example, in response to an light sensing detection device detecting some amounts of changes of the environmental light luminance, automatic regulation of the aperture is triggered; and in response to detecting a change of the projection position, automatic focusing needs to be performed again to achieve clear projection. It should be noted that detecting the change of the projection environment may include acquiring the projection image or the environmental image in real time, and determining a reference condition of the change of the projection environment by analysis and detection of the image of the projection screen picture.

It should be noted that in the above various embodiments, the steps are not subject to a definite order during execution, and persons of ordinary skill in the art would understand, based on the description of the embodiments of the present application, in different embodiments, the above steps may be performed in different orders, that is, may be concurrently performed, or alternately performed.

In another aspect of the embodiments of the present application, an embodiment of the present application provides a projection device. The projection device according to the embodiments of the present application may be used as a software function unit. The projection device includes several instructions. The several instructions are stored in a memory. A processor may access the memory to call and execute the instructions to perform the projection method as described above.

Figure 6A:
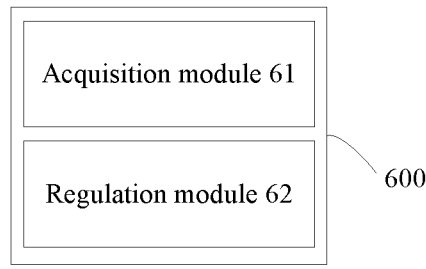
FIG. 6a is a schematic structural diagram of a projection device according to an embodiment of the present application.

Referring to FIG. 6a, the projection device 600 includes an acquisition module 61 and a regulation module 62.

The acquisition module 61 is configured to acquire a projection image and an environmental image when a screen picture is projected to a projection region, wherein the environmental image includes an image when a predetermined projection screen picture is projected to the projection region or an image when no screen picture is projected to the projection region.

The regulation module 62 is configured to regulate an aperture based on the projection image and the environmental image, wherein the aperture is configured to control a light flux projected to the projection region.

In summary, by adjusting the aperture, impacts caused by the stray light may be mitigated, and a relationship between the projection contrast and the luminance may be better coordinated, such that the projection contrast and luminance are effectively balanced and hence projection quality is improved.

Figure 6B:
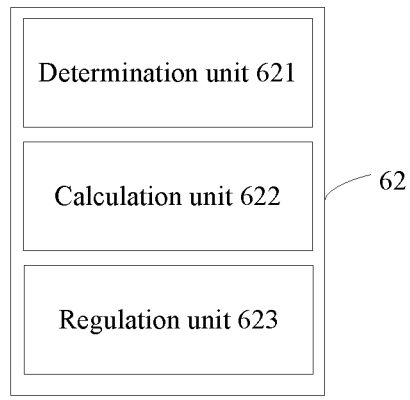

In some embodiments, referring to FIG. 6b, the regulation module 62 includes a determination unit 621, a calculation unit 622, and a regulation unit 623.

The determination unit 621 is configured to determine a stray light region image of stray light in the projection image and an environmental light region image of environmental light in the environmental image.

The calculation unit 622 is configured to calculate a stray light luminance in the stray light region image and an environmental light luminance in the environmental light region image.

The regulation unit 623 is configured to regulate the aperture based on the stray light luminance and the environmental light luminance.

In some embodiments, the calculation unit 622 is specifically configured to: select a common optimal pixel reference point from the stray light region image and the environmental light region image; and select a luminance of the optimal pixel reference point in the stray light region image as the stray light luminance and a luminance of the optimal pixel reference point in the environmental light region image as the environmental light luminance.

In some embodiments, the calculation unit 622 is further specifically configured to determine a common pixel point with a maximum difference between the luminance in the stray light region image and the environmental light region image as the optimal pixel reference point by traversing all common pixel points of the stray light region image and the environmental light region image.

In some embodiments, the calculation unit 622 is further specifically configured to: filter the stray light region image and the environmental light region image using a predetermined image filter algorithm; calculate an average of stray light luminances of all pixel points in the filtered stray light region image and an average of environmental light luminances of all pixel points in the filtered environmental light region image; and select the average of the stray light luminances as the stray light luminance and the average of the environmental light luminances as the environmental light luminance.

In some embodiments, the predetermined image filter algorithm includes a median filter algorithm.

In some embodiments, the determination unit 621 is specifically configured to: determine a screen image of a projection screen picture in the projection image; and determine the stray light region image of the stray light from the projection image based on the screen image.

In some embodiments, the determination unit 621 is specifically configured to: calculate an average of projection luminances of all pixel points in the projection image; determine pixel points with luminances greater than or equal to the average of the projection luminances in the projection image; and form the screen image by linking the determined pixel points.

In some embodiments, the determination unit 621 is specifically configured to: determine an image boundary of the screen image; and form the stray light region image by linking pixel points that are not enclosed by the image boundary.

In some embodiments, the screen image includes a quadrilateral image. The determination unit 621 is specifically configured to: determine coordinates of four intersections of the quadrilateral image; and form the image boundary of the screen image by linking each two adjacent coordinates of the intersections.

In some embodiments, the regulation unit 623 is specifically configured to: calculate a luminance difference between the stray light luminance and the environmental light luminance; identify whether the luminance difference satisfies a predetermined threshold condition; stop regulating the aperture in response to identifying that the luminance difference satisfies the predetermined threshold condition; and continue regulating the aperture in response to identifying that luminance difference does not satisfy the predetermined threshold condition.

In some embodiments, the regulation unit 623 is further specifically configured to: continue acquiring another frame of projection image when the screen picture is projected to the projection region; and regulate the aperture based on the another frame of projection image and the environmental image until the luminance difference satisfies the predetermined threshold condition.

In some embodiments, the predetermined threshold condition includes the luminance difference being less than a predetermined threshold.

Figure 6C:
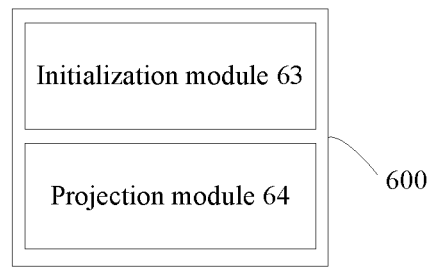
FIG. 6c is a schematic structural diagram of a projection device according to another embodiment of the present application.

In some embodiments, referring to FIG. 6c, the projection device 600 further includes an initialization module 63 and a projection module 64.

The initialization module 63 is configured to initialize a projection function to achieve automatic focusing.

The projection module 64 is configured to project a predetermined projection screen picture to a projection region.

Figure 6D:
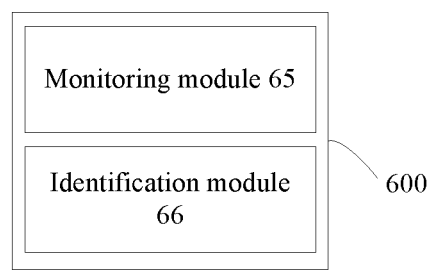
FIG. 6d is a schematic structural diagram of a projection device according to still another embodiment of the present application.

In some embodiments, the predetermined projection screen picture includes an image with a white background and a black frame. Referring to FIG. 6d, the projection device 600 further includes a monitoring module 65 and an identification module 66.

The monitoring module 65 is configured to monitor whether a projection environment of the projection region changes.

The identification module 66 is configured to: continue acquiring the projection image when the screen picture is projected to the projection region and the environmental image when no screen picture is projected to the projection region in response to monitoring that the projection environment of the projection region changes.

In some embodiments, the projection environment includes an environmental light luminance and/or a projection position.

It should be noted that the above projection apparatus is capable of performing the projection method according to the embodiments of the present application, has corresponding function modules for performing the method, and achieves the corresponding beneficial effects. For technical details that are not illustrated in detail in the embodiments of the projection device, reference may be made to the description of the projection method according to the embodiments of the present application.

Figure 7:
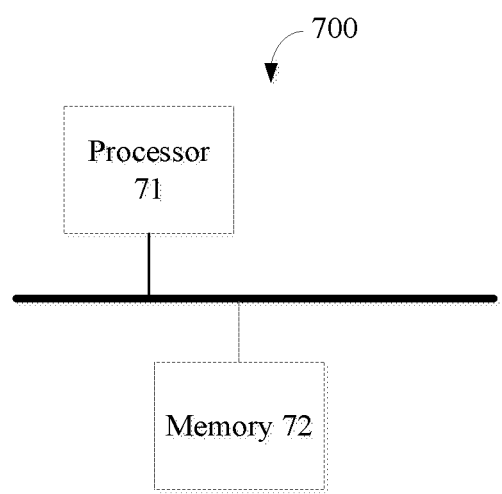
FIG. 7 is a schematic structural diagram of a controller according to an embodiment of the present application.

According to still another aspect of the embodiments of the present application, an embodiment of the present application provides a controller 700. Referring to FIG. 7, the controller 700 includes at least one processor 71 and a memory 72. FIG. 7 uses one processor 71 as an example.

The processor 71 and the memory 72 may be connected via a bus or in another manner, and FIG. 7 uses the bus as an example.

The memory 72, as a non-volatile computer readable storage medium, may be configured to store non-volatile software programs, non-volatile computer executable programs and modules, for example, the program instructions/modules corresponding to the projection method according to the embodiments of the present application. The non-volatile software programs, instructions, and modules stored in the memory 72, when executed by the processor 71, cause the processor 71 to perform the projection methods according to the various embodiments, or perform various function applications and data processing of the projection devices according to the various embodiments.

In addition, the memory 72 may include a high speed random-access memory, or may include a non-volatile memory, for example, at least one disk storage device, a flash memory device, or another non-volatile solid storage device. In some embodiments, the memory 72 optionally includes memories remotely configured relative to the processor 71. These memories may be connected to the processor 71 over a network. Examples of the above network include, but not limited to, the Internet, Intranet, local area network, mobile communication network and a combination thereof.

The program instructions/modules are stored in the memory 72, which, when executed by the at least one processor 71, cause the at least one processor 71 to perform the projection method according to any one of the above embodiments, for example, performing the projection methods according to the various embodiments, or performing various function applications and data processing of the projection devices according to the various embodiments.

An embodiment of the present application provides a non-transitory computer-readable storage medium. The non-transitory computer-readable storage medium stores at least one computer-executable instruction, which, when loaded and executed by a projection device, causes the projection device to perform the projection method as described above.

An embodiment of the present application provides a computer program product including a computer program stored in a non-volatile computer-readable storage medium. The computer program includes at least one program instruction, which, when loaded and executed by a projection device, causes the projection device to perform the projection method as described above.

In summary, by adjusting the aperture, impacts caused by the stray light may be mitigated, and a relationship between the projection contrast and the luminance may be better coordinated, such that the projection contrast and luminance are effectively balanced and hence projection quality is improved.

The above described device embodiments are merely for illustration purpose only. The modules and units which are described as separate components may be physically separated or may be not physically separated, and the components which are illustrated as modules and units may be or may not be physical modules and units, that is, the components may be located in the same position or may be distributed into a plurality of network modules and units. Part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Based on such understanding, portions of the technical solutions of the present application that essentially contribute to the related art may be embodied in the form of a software product, the computer software product may be stored in a storage medium, such as a ROM/RAM, a magnetic disk, or a CD-ROM, including several instructions for causing a computer device (a personal computer, a server, or a network device) to perform the various embodiments of the present application, or certain portions of the method of the embodiments.

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A projection method, comprising:
  acquiring a projection image and an environmental image when a screen picture is projected to a projection region, wherein the environmental image comprises an image when a predetermined projection screen picture is projected to the projection region or an image when no screen picture is projected to the projection region;
  regulating an aperture based on the projection image and the environmental image, wherein the aperture is configured to control a light flux projected to the projection region;

wherein regulating the aperture based on the projection image and the environmental image comprises:
  determining a stray light region image of stray light in the projection image and an environmental light region image of environmental light in the environmental image;
  calculating a stray light luminance in the stray light region image and an environmental light luminance in the environmental light region image;
  regulating the aperture based on the stray light luminance and the environmental light luminance.

2. The method according to claim 1, wherein calculating the stray light luminance in the stray light region image and the environmental light luminance in the environmental light region image comprises:
  selecting a common optimal pixel reference point from the stray light region image and the environmental light region image;
  selecting a luminance of the optimal pixel reference point in the stray light region image as the stray light luminance and a luminance of the optimal pixel reference point in the environmental light region image as the environmental light luminance.

3. The method according to claim 2, wherein selecting the common optimal pixel reference point from the stray light region image and the environmental light region image comprises:
  determining a common pixel point with a maximum difference between the luminances in the stray light region image and the environmental light region image as the optimal pixel reference point by traversing all common pixel points of the stray light region image and the environmental light region image.

4. The method according to claim 2, wherein selecting the luminance of the optimal pixel reference point in the stray light region image as the stray light luminance and the luminance of the optimal pixel reference point in the environmental light region image as the environmental light luminance comprises:
  filtering the stray light region image and the environmental light region image using a predetermined image filter algorithm;
  calculating an average of stray light luminances of all pixel points in the filtered stray light region image and an average of environmental light luminances of all pixel points in the filtered environmental light region image;
  selecting the average of the stray light luminances as the stray light luminance and the average of the environmental light luminances as the environmental light luminance.

5. The method according to claim 1, wherein determining the stray light region image of the stray light in the projection image comprises:
  determining a screen image of a projection screen picture in the projection image;
  determining the stray light region image of the stray light from the projection image based on the screen image.

6. The method according to claim 5, determining the screen image of the projection screen picture in the projection image comprises:
  calculating an average of projection luminances of all pixel points in the projection image;
  determining pixel points with luminances greater than or equal to the average of the projection luminances in the projection image;
  forming the screen image by linking the determined pixel points.

7. The method according to claim 6, wherein determining the stray light region image of the stray light from the projection image based on the screen image comprises:
  determining an image boundary of the screen image;
  forming the stray light region image by linking pixel points that are not enclosed by the image boundary.

8. The method according to claim 7, wherein the screen image comprises a quadrilateral image;
  determining the image boundary of the screen image comprises:
  determining coordinates of four intersections of the quadrilateral image;
  forming the image boundary of the screen image by linking each two adjacent coordinates of the intersections.

9. The method according to claim 1, wherein regulating the aperture based on the stray light luminance and the environmental light luminance comprises:
  calculating a luminance difference between the stray light luminance and the environmental light luminance;
  stopping regulating the aperture in response to identifying that the luminance difference satisfies the predetermined threshold condition;
  continuing regulating the aperture in response to identifying that luminance difference does not satisfy the predetermined threshold condition.

10. The method according to claim 9, wherein continuing regulating the aperture comprises:
  continuing acquiring another frame of projection image when the screen picture is projected to the projection region;
  regulating the aperture based on the another frame of projection image and the environmental image until the luminance difference satisfies the predetermined threshold condition.

11. The method according to claim 9, wherein the predetermined threshold condition comprises the luminance difference being less than a predetermined threshold.

12. The method according to claim 1, further comprising:
  initializing a projection function to achieve automatic focusing;
  projecting the predetermined projection screen picture to the projection region.

13. The method according to claim 1, further comprising:
  continuing acquiring the projection image when the screen picture is projected to the projection region and the environmental image when no screen picture is projected to the projection region in response to monitoring that the projection environment of the projection region changes;
  executing a predetermined logic in response to monitoring that the projection environment of the projection region does not change.

14. The method according to claim 13, the projection environment comprises an environmental light luminance and/or a projection position.

15. A projection device, comprising:
  a projection module, configured to project a projection screen picture to a projection region;
  an image acquisition module, configured to acquire an image of the projection region;
  an aperture, configured to control a light flux projected to the projection region; and
  a controller, connected to the projection module and the image acquisition module;

wherein the projection module comprises an illumination light source and a projection lens, the projection lens being arranged on a light exit side of the illumination light source, the aperture being arranged between the illumination light source and the projection lens;

wherein the controller comprises:

at least one processor; and a memory communicably connected to the at least one processor; wherein the memory stores instructions executable by the at least one processor, wherein the instructions, when executed by the at least one processor, cause the at least one processor to perform:

acquiring a projection image and an environmental image when a screen picture is projected to a projection region, wherein the environmental image comprises an image when a predetermined projection screen picture is projected to the projection region or an image when no screen picture is projected to the projection region;

regulating an aperture based on the projection image and the environmental image, wherein the aperture is configured to control a light flux projected to the projection region;

wherein regulating the aperture based on the projection image and the environmental image comprises:

determining a stray light region image of stray light in the projection image and an environmental light region image of environmental light in the environmental image;

calculating a stray light luminance in the stray light region image and an environmental light luminance in the environmental light region image;

regulating the aperture based on the stray light luminance and the environmental light luminance.

16. The projection device according to claim 15, further comprising a sensor module, connected to the controller, and configured to acquire environmental data of a projection environment of the projection region.

* * * * *